United States Patent
Iura et al.

(10) Patent No.: US 7,860,424 B2
(45) Date of Patent: Dec. 28, 2010

(54) MANAGING AND UTILIZING ERROR INFORMATION RELATING TO IMAGE PROCESSING

(75) Inventors: Saori Iura, Tokyo (JP); Nobuhiro Shindo, Tokyo (JP); Toshiya Suzuki, Kanagawa (JP); Michiaki Nishinosono, Tokyo (JP); Yutaka Matsumoto, Saitama (JP); Hiroki Ohzaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 969 days.

(21) Appl. No.: 11/678,375

(22) Filed: Feb. 23, 2007

(65) Prior Publication Data

US 2007/0220353 A1    Sep. 20, 2007

(30) Foreign Application Priority Data

Feb. 24, 2006   (JP)   ............................. 2006-049047

(51) Int. Cl.
    *G03G 15/00*   (2006.01)
(52) U.S. Cl. ................................ 399/81; 399/8; 399/21
(58) Field of Classification Search ...................... 399/9, 399/10
    See application file for complete search history.

(56) References Cited

U.S. PATENT DOCUMENTS 5,689,765 A    11/1997  Nishinozono
5,913,090 A *   6/1999  Sawada et al. ................. 399/8
7,389,057 B2 *  6/2008  Yamaguchi et al. ............. 399/8
2006/0056872 A1 *  3/2006  Hosoi ........................... 399/81
2006/0149718 A1   7/2006  Ohzaki

FOREIGN PATENT DOCUMENTS

JP        7-175685      7/1995
JP        2004-280256   10/2004

\* cited by examiner

*Primary Examiner*—David M Gray
*Assistant Examiner*—Roy Yi
(74) *Attorney, Agent, or Firm*—Oblon, Spivak, McClelland, Maier & Neustadt, L.L.P.

(57) ABSTRACT

Image processing apparatus and method to perform an image processing job based on a received processing request, which includes a processing condition set by a user. Error protection is performed to detect a job setting error caused by a mismatching between the processing condition of the image processing job and a processing capability of the image processing apparatus. Error information relates to a previously detected air that is the job setting error previously detected. Error report conditions indicate whether the previously detected air has a same condition as the processing condition of the image processing job. Error information is managed to store information relating to the currently detected error when the currently detected error satisfies an error storage condition, determine whether the currently detected satisfies the error report condition and generate an error report to notify the user and an administrator when these conditions are satisfied.

17 Claims, 16 Drawing Sheets

| ERROR INFORMATION ITEM | VALUE |
|---|---|
| USER NAME | Y |
| JOB NAME | Y |
| JOB CONDITION | Y |
| REQUEST SENT TIME | N |
| REQUEST RECEIVED TIME | N |
| JOB START TIME | Y |
| ERROR DETECTED TIME | Y |
| ERROR RECOVERED TIME | N |
| ERROR TYPE | Y |

FIG. 5

| CONDITION | CONDITION ITEM | VALUE |
|---|---|---|
| STORAGE | RETAIN TIME | 1 MONTH |
| STORAGE | MAXIMUM ERROR NUMBER | 10 |
| REPORT | USER NAME | ALL USERS |
| REPORT | JOB NAME | |
| REPORT | JOB CONDITION | AT LEAST TWO OF (DOUBLE-SIDED, CONDENSED, PAPER TYPE: RECYCLE, SHEET SIZE: A3) |
| REPORT | REQUEST SENT TIME | |
| REPORT | REQUEST RECEIVED TIME | |
| REPORT | JOB START TIME | 13:00-18:30 |
| REPORT | ERROR DETECTED TIME | 13:00-18:30 |
| REPORT | ERROR RECOVERED TIME | |
| REPORT | ERROR TYPE | AT LEAST ONE OF (SHEET SIZE ERROR, FULL MEMORY ERROR) |

FIG. 6

| CONDITION | OPERATION |
|---|---|
| STORAGE CONDITION SATISFIED | STORE ERROR INFORMATION OF DETECTED ERROR |
| STORAGE CONDITION NOT SATISFIED | DELETE ERROR INFORMATION OF SELECTED ERROR AND NOTIFY SELECTED USER |
| REPORT CONDITION SATISFIED | SEND ERROR REPORT TO SELECTED USER |
| REPORT CONDITION NOT SATISFIED | SEND NO REPORT |

FIG. 7A

| INDEX NO. | USER NAME | JOB NAME | JOB CONDITION | JOB START TIME | ERROR DETECTED TIME | ERROR TYPE |
|---|---|---|---|---|---|---|
| 1 | A | PHYSICS TEST | PAPER TYPE: RECYCLE, SHEET SIZE: A3 | 7/1/2005 13:10:50 | 7/1/2005 13:11:30 | SHEET SIZE ERROR |
| 2 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 3 | F | PHYSICS QUESTION | PAPER TYPE: RECYCLE, SHEET SIZE: A3 | 7/3/2005 15:40:01 | 7/3/2005 15:49:12 | SHEET SIZE ERROR |
| 4 | P | MEETING | CONDENSE, PAPER TYPE: RECYCLE, SHEET SIZE: A3 | 7/5/2005 13:53:35 | 7/5/2005 14:00:23 | SHEET SIZE ERROR |
| 5 | F | FOSSIL | DOUBLE-SIDED, CONDENSE | 7/3/2005 16:10:50 | 7/3/2005 16:30:22 | FULL MEMORY ERROR |

FIG. 7B

| INDEX NO. | USER NAME | JOB NAME | JOB CONDITION | JOB START TIME | ERROR DETECTED TIME | ERROR TYPE |
|---|---|---|---|---|---|---|
| 1 | A | PHYSICS TEST | PAPER TYPE: RECYCLE, SHEET SIZE: A3 | 7/1/2005 13:10:50 | 7/1/2005 13:11:30 | SHEET SIZE ERROR |
| 2 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 3 | P | MEETING | CONDENSE, PAPER TYPE: RECYCLE, SHEET SIZE: A3 | 7/5/2005 13:53:35 | 7/5/2005 14:00:23 | SHEET SIZE ERROR |

| INDEX NO. | USER NAME | JOB NAME | JOB CONDITION | JOB START TIME | ERROR DETECTED TIME | ERROR TYPE |
|---|---|---|---|---|---|---|
| 1 | A | PHYSICS TEST | PAPER TYPE: RECYCLE, SHEET SIZE: A3 | 7/1/2005 13:10:50 | 7/1/2005 13:11:30 | SHEET SIZE ERROR |
| 2 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 3 | A | PHYSICS QUESTION | PAPER TYPE: RECYCLE, SHEET SIZE: A3 | 7/3/2005 15:40:01 | 7/3/2005 15:49:12 | SHEET SIZE ERROR |
| 4 | F | FOSSIL | DOUBLE-SIDED, CONDENSE | 7/3/2005 16:10:50 | 7/3/2005 16:30:22 | FULL MEMORY ERROR |
| 5 | P | MEETING | CONDENSE, PAPER TYPE: RECYCLE, SHEET SIZE: A3 | 7/5/2005 13:53:35 | 7/5/2005 14:00:23 | SHEET SIZE ERROR |

FIG. 8AB

| | | | | | |
|---|---|---|---|---|---|
| 6 | M | ANNOUNCE-MENT | CONDENSE, SHEET SIZE: A3 | 7/6/2005 14:10:50 | 7/7/2005 13:00:05 | SHEET SIZE ERROR |
| 7 | Q | HISTORY | DOUBLE-SIDED, SHEET SIZE: A3 | 7/17/2005 13:10:50 | 7/17/2005 13:14:23 | SHEET SIZE ERROR, FULL MEMORY ERROR |
| 8 | F | JAPAN MAP | DOUBLE-SIDED, CONDENSE | 7/18/2005 17:55:49 | 7/18/2005 17:56:50 | FULL MEMORY ERROR |
| 9 | W | HUMAN ANATOMY | CONDENSE, PAPER TYPE: RECYCLE | 7/22/2005 15:14:37 | 7/22/2005 15:20:54 | FULL MEMORY ERROR |
| 10 | F | TEACHING GUIDE | DOUBLE-SIDED, CONDENSE | 7/23/2005 18:42:02 | 7/23/2005 18:50:17 | FULL MEMORY ERROR |

FIG. 8B

| FIG. 8BA |
|---|
| FIG. 8BB |

FIG. 8BA

| INDEX NO. | USER NAME | JOB NAME | JOB CONDITION | JOB START TIME | ERROR DETECTED TIME | ERROR TYPE |
|---|---|---|---|---|---|---|
| 1 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 2 | F | FOSSIL | DOUBLE-SIDED, CONDENSE | 7/3/2005 16:10:50 | 7/3/2005 16:30:22 | FULL MEMORY ERROR |
| 3 | P | MEETING | CONDENSE, PAPER TYPE: RECYCLE, SHEET SIZE: A3 | 7/5/2005 13:53:35 | 7/5/2005 14:00:23 | SHEET SIZE ERROR |

FIG. 8BB

| | | | | | |
|---|---|---|---|---|---|
| 4 | M | ANNOUNCE-MENT | CONDENSE, SHEET SIZE: A3 | 7/6/2005 14:10:50 | 7/7/2005 13:00:05 | SHEET SIZE ERROR |
| 5 | Q | HISTORY | DOUBLE-SIDED, SHEET SIZE: A3 | 7/17/2005 13:10:50 | 7/17/2005 13:14:23 | SHEET SIZE ERROR, FULL MEMORY ERROR |
| 6 | F | JAPAN MAP | DOUBLE-SIDED, CONDENSE | 7/18/2005 17:55:49 | 7/18/2005 17:56:50 | FULL MEMORY ERROR |
| 7 | W | HUMAN ANATOMY | CONDENSE, PAPER TYPE: RECYCLE, | 7/22/2005 15:14:37 | 7/22/2005 15:20:54 | FULL MEMORY ERROR |
| 8 | F | TEACHING GUIDE | DOUBLE-SIDED, CONDENSE | 7/23/2005 18:42:02 | 7/23/2005 18:50:17 | FULL MEMORY ERROR |

FIG. 9

| INDEX NO. | USER NAME | JOB NAME | JOB CONDITION | JOB START TIME | ERROR DETECTED TIME | ERROR TYPE |
|---|---|---|---|---|---|---|
| 1 | A | PHYSICS TEST | PAPER TYPE: RECYCLE, SHEET SIZE: A3 | 7/1/2005 13:10:50 | 7/1/2005 13:11:30 | SHEET SIZE ERROR |
| 2 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 3 | F | PHYSICS QUESTION | PAPER TYPE: RECYCLE, SHEET SIZE: A3 | 7/3/2005 15:40:01 | 7/3/2005 15:49:12 | SHEET SIZE ERROR |
| 4 | P | MEETING | CONDENSE, PAPER TYPE: RECYCLE, SHEET SIZE: A3 | 7/5/2005 13:53:35 | 7/5/2005 14:00:23 | SHEET SIZE ERROR |
| 5 | F | FOSSIL | DOUBLE-SIDED, CONDENSE | 7/3/2005 16:10:50 | 7/3/2005 16:30:22 | FULL MEMORY ERROR |
| 6 | F | FINAL EXAM | DOUBLE-SIDED, PAPER TYPE: RECYCLE, SHEET SIZE: A3 | 7/25/2005 19:50:11 | 7/25/2005 19:51:53 | SHEET SIZE ERROR |

| CONDITION | CONDITION ITEM | VALUE |
|---|---|---|
| REPORT | REPORT TIME | END OF MONTH, 23:59:59 |
| REPORT | MAXIMUM ERROR NUMBER | 8 |

| CONDITION | OPERATION |
|---|---|
| REPORT CONDITION SATISFIED | SEND REPORT TO SELECTED USER AND DELETE REPORTED ERROR |
| REPORT CONDITION NOT SATISFIED | SEND NO REPORT |

FIG. 12

| INDEX NO. | USER NAME | JOB NAME | JOB CONDITION | JOB START TIME | ERROR DETECTED TIME | ERROR TYPE |
|---|---|---|---|---|---|---|
| 1 | F | PHYSICS QUESTION | PAPER TYPE: RECYCLE, SHEET SIZE: A3 | 7/3/2005 15:40:01 | 7/3/2005 15:49:12 | SHEET SIZE ERROR |
| 2 | F | FOSSIL | DOUBLE-SIDED, CONDENSE | 7/3/2005 16:10:50 | 7/3/2005 16:30:22 | FULL MEMORY ERROR |
| 3 | A | PHYSICS TEST | PAPER TYPE: RECYCLE, SHEET SIZE: A3 | 7/1/2005 13:10:50 | 7/1/2005 13:11:30 | SHEET SIZE ERROR |
| 4 | B | CHEMISTRY SAMPLES | DOUBLE-SIDED, PAPER TYPE: RECYCLE | 7/1/2005 13:30:00 | 7/1/2005 13:33:10 | FULL MEMORY ERROR |
| 5 | P | MEETING | CONDENSE, PAPER TYPE: RECYCLE, SHEET SIZE: A3 | 7/5/2005 13:53:35 | 7/5/2005 14:00:23 | SHEET SIZE ERROR |

| CONDITION | CONDITION ITEM | VALUE |
|---|---|---|
| HELP | USER | A, B |
| HELP | JOB NAME | |
| HELP | JOB CONDITION | AT LEAST TWO OF (DOUBLE-SIDED, CONDENSE, PAPER TYPE: RECYCLE, SHEET SIZE: A3, STAPLE) |
| HELP | REQUEST SENT TIME | |
| HELP | REQUEST RECEIVED TIME | |
| HELP | JOB START TIME | 13:00-18:30 |
| HELP | ERROR DETECTED TIME | 13:00-18:30 |
| HELP | ERROR RECOVERED TIME | 9:00-12:00 |
| HELP | ERROR TYPE | AT LEAST ONE OF (SHEET SIZE ERROR, FULL MEMORY ERROR, JAM ERROR) |

FIG. 15

| CONDITION | OPERATION |
|---|---|
| HELP CONDITION SATISFIED | SEND REPORT AND HELP INFORMATION TO SELECTED USER |
| HELP CONDITION NOT SATISFIED | SEND NO REPORT NOR HELP INFORMATION |

FIG. 16

| INDEX NO. | USER NAME | JOB NAME | JOB CONDITION | JOB START TIME | ERROR DETECTED TIME | ERROR TYPE |
|---|---|---|---|---|---|---|
| 1 | A | PHYSICS TEST | PAPER TYPE: RECYCLE, SHEET SIZE: A3 | 7/1/2005 13:10:50 | 7/1/2005 13:11:30 | SHEET SIZE ERROR |
| 2 | A | PHYSICS QUESTION | PAPER TYPE: RECYCLE, SHEET SIZE: A3 | 7/3/2005 15:40:01 | 7/3/2005 15:49:12 | SHEET SIZE ERROR |

FIG. 17

☑ DOES A REQUESTED SHEET SIZE MATCH THE DEFAULT SHEET SIZE?
☐ DOES A REQUESTED PAPER TYPE MATCH THE DEFAULT PAPER TYPE?

FIG. 18

| LOCATION | TIME FORMAT |
|---|---|
| JAPAN CHINA TAIWAN KOREA | YYYY 年 MM 月 DD 日 W 曜日　tt 時 mm 分 ss 秒 |
| NORTH AMERICA | YYYY/MM/DD, W (FULL SPELL, ABBREVIATED), tt:mm:ss |
| | MM/DD/YYYY, W (FULL SPELL, ABBREVIATED), tt:mm:ssAM (PM) |
| | MM (LANGUAGE) DD, YYYY, W (FULL SPELL, ABBREVIATED), tt:mm:ss |
| EUROPE ASIA | DD.MM.YYYY, W (FULL SPELL, ABBREVIATED), tt:mm:ss |

MANAGING AND UTILIZING ERROR INFORMATION RELATING TO IMAGE PROCESSING

CROSS-REFERENCE TO RELATED APPLICATIONS

This patent application is based on and claims priority under 35 U.S.C. §119 to Japanese patent application No. 2006-049047 filed on Feb. 24, 2006, in the Japanese Patent Office, the entire contents of which are hereby incorporated by reference.

FIELD OF THE INVENTION

Example embodiments of the present invention relate generally to an apparatus, method, system, computer program and product, each capable of managing error information relating to an image processing job requested by a user, and utilizing the error information to assist the user in performing the image processing job.

DESCRIPTION OF THE RELATED ART

A recent image processing apparatus is provided with a wide variety of functions that a user may be required to have a high level of knowledge in order to make full use of such a sophisticated apparatus. Further, with the wide spread use of the image processing apparatus, the number of users who do not have a high level of knowledge, such as general users, has increased relative to the number of users who have a high level of knowledge, such as administrators. On the other hand, since the image processing apparatus may be used by a large number of users via a network, such as the Internet, it may be difficult for the administrator to keep track of the activity of each user. With this trend, the user may encounter one or more problems as described below.

First, the general user may not be familiar with how to appropriately set conditions or parameters ("the processing condition") that are used by the apparatus for processing an image processing job requested by the user For this reason, work or time it requires the general user for requesting the image processing job, including setting the processing condition of the image processing job, may increase. Further, the frequency of errors may increase, which may be caused due to the inappropriate setting of the processing condition.

Second, the general user may not be familiar with how to solve an error when the error relating to the image processing job is detected. For this reason, the time it takes for the error to be solved may increase.

Third, when the number of errors increases or the time for solving the error increases as described above, the user, including the general user and the administrator, may not be able to use the image processing apparatus for longer time.

While the Japanese Patent Application Publication Nos. 2004-280256 and H07-175685 both address the third problem, they fail to address the first and second problems, which are caused by the increased number of users with less knowledge.

SUMMARY

One objective of the present invention is to provide a solution to the first problem that the general user may not be familiar with how to appropriately set the processing condition of an image processing job. Once the first problem is solved, other problems that may be caused by the first problem, including the above-described second and third problems, may not occur.

Another objective of the present invention is to provide a solution to the second problem that the general user may not be familiar with how to solve an error when the error is detected Once the second problem is solved, other problems that may be caused by the second problem, including the above-described third problem, may not occur.

In view of the above-described and other objectives, example embodiments of the present invention include an apparatus, method, system, computer program and products each capable of receiving a processing request for performing an image processing job, which includes a processing condition of the image processing job set by a user, from the user through a user interface; detecting a job setting error caused by mismatching between the processing condition of the image processing job and a processing capability of an image processing apparatus as a currently detected error; and storing error information relating to the currently detected error in an error management table when the currently detected error satisfies an error storage condition.

The error information of the currently detected error includes one or more error information items selected according to an error storage condition For example, the one or more error information items may include user information regarding the user who sends the processing request, job information regarding the image processing job, error time information such as error detected time information or error recovered time information, and/or error type information indicating a type of the currently detected error.

In addition to the currently detected error, the error management table may store error information relating to a previously detected error, which is a job setting error previously detected.

The error storage condition may control the number of previously and currently detected errors that can be retained in the error management table, for example, by setting error retain information and/or error number information.

When the currently detected error does not satisfy the error storage condition, operation previously defined by an error storage operation condition may be performed such as deleting the previously detected error from the error management table.

Any one of the error storage item condition, error storage condition, and error storage operation condition may be input or changed through the user interface In addition to storing, an error report may be generated for notification to a selected user, such as the user who sends the processing request or an administrator, when the currently detected error satisfies an error report condition. The error report may include one or more error information items selected according to an error report item condition.

The error report condition may control report time at which the error report is generated, for example, by setting report time information and/or error number information. For example, the error report condition may be set such that when a current time value reaches a time value set by the error condition, the error report is generated. The error report may be further sent to the administrator who manages the error management table.

Alternatively, the error report condition may determine whether any previously detected error falls under the same condition of the currently detected error. For example, the error report condition may be set such that the error report is generated when the user information item of the currently detected error matches the user information item of the previously detected error. In such case, the error report may include error information of the previously detected error caused by the user, in addition to the currently detected error. In another example, the error report condition may be set such that the error report is generated when the job information item of the currently detected error matches the job information item of the previously detected error. In another example, the error report condition may be set such that the error report is generated when the error type information item of the currently detected error matches the error type information item of the previously detected error.

Alternatively, the error report condition may determine whether a waiting time, which corresponds to the difference between the time when the error is detected and the time when the error is solved, reaches a predetermined value. When the waiting time reaches the predetermined value, the error report is generated.

In this example, operation performed when the error report condition is satisfied may be changed according to an error report operation condition. Further, any one of the error report item condition, error report condition, and error report operation condition may be input or changed through the user interface.

In addition to generating the error report, help information that assists the user in performing the image processing job may be generated when the processing condition of the processing request satisfies an error help condition.

The other example embodiments of the present invention include an apparatus, method, system, computer program and product, each capable of storing error information of a previously detected error; determining whether to generate an error report comprising the error information of the previously detected error based on whether an error report condition is satisfied; and generating the error report when the error report condition is satisfied.

The other example embodiments of the present invention include an apparatus, method, system, computer program and product, each capable of storing error information of a previously detected error; receiving a processing request for performing an image processing job from a user, which includes a processing condition set by the user; determining whether the processing condition of the processing request satisfies an error help condition; and generating help information to be notified to the user when the processing condition of the processing request satisfies the error help condition.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is an example table storing an error storage condition and an error report condition;

FIG. 6 is an example table storing an error storage operation condition and an error report operation condition;

FIG. 7A is an example error management table storing error information of previously detected errors, which is obtained before an error is detected;

FIG. 7B is an example error management table storing error information of previously detected errors, which is updated from the error management table of FIG. 7A after the error is detected;

FIG. 8A is an example error management table storing error information of previously detected errors, which is obtained before an error is detected;

FIG. 8B is an example error management table storing error information of previously detected errors and a currently detected error, which is updated from the error management table of FIG. 8A after the error is detected;

FIG. 9 is an example error management table storing error information of previously detected errors and a currently detected error, which is updated from the error management table of FIG. 7A after the error is detected;

FIG. 12 is an example table listing error information of previously detected errors, which is generated from the error management table of FIG. 7A;

FIG. 15 is an example table storing an error help operation condition;

FIG. 16 is an example table listing error information of previously detected errors of a user, which is displayed to the user as an error report;

FIG. 17 is an example window having help information, which is displayed to a user; and FIG. 18 is an example table illustrating the correspondence between a location of the image processing apparatus of FIG. 1 and a recommended time format to be used by the image processing apparatus of FIG. 1.

DETAILED DESCRIPTION OF THE INVENTION

Figure 1:
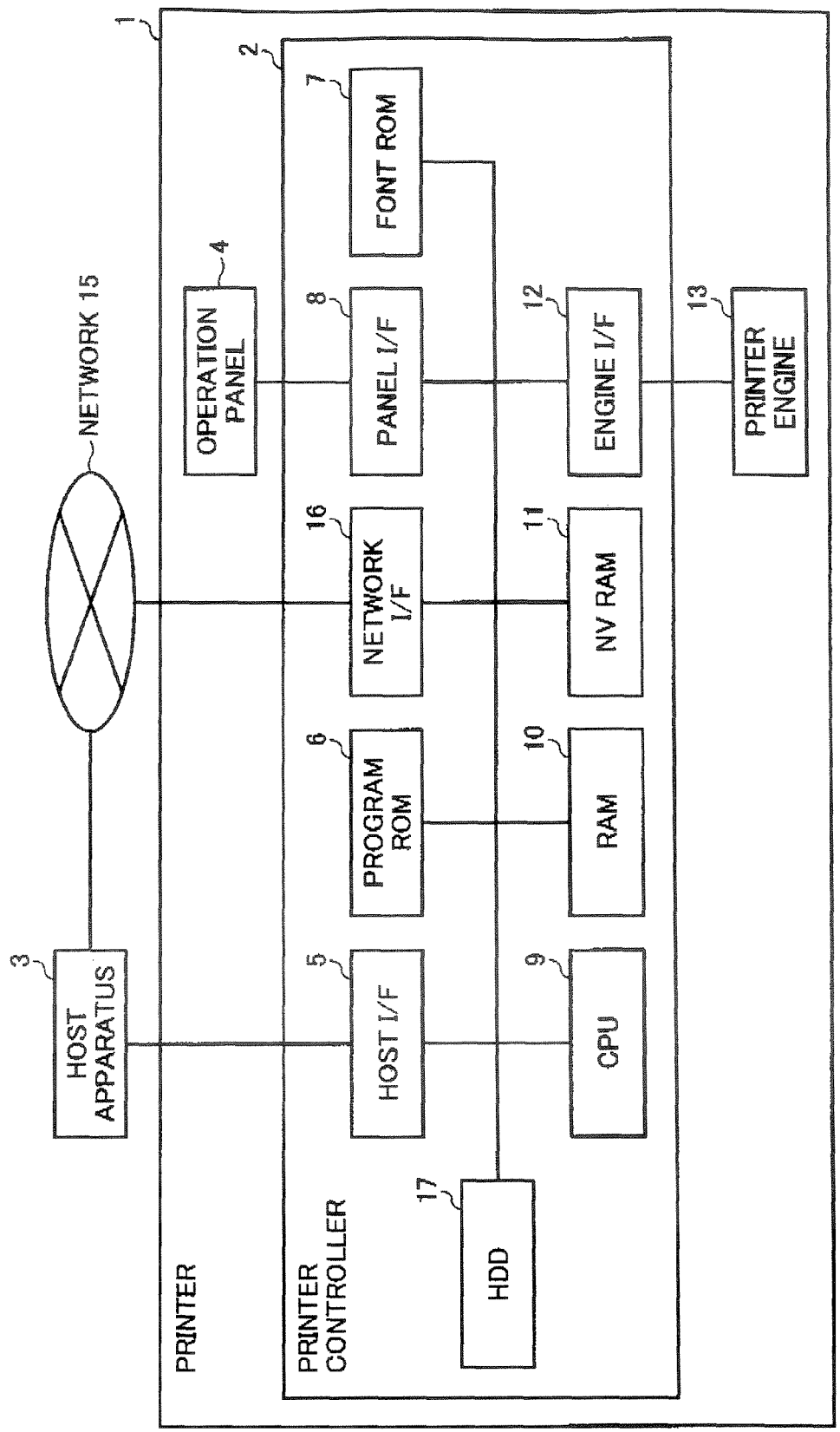
FIG. 1 is a schematic block diagram illustrating the hardware structure of a printer controller and its surroundings, provided in an image processing apparatus, according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", and "the" are intended to include the plural forms as well, unless the context clearly indicates otherwise.

Referring now to the drawings, wherein like reference numerals designate identical or corresponding parts throughout the several views, FIG. 1 illustrates an image processing apparatus 1 according to an example embodiment of the present invention. The image processing apparatus 1 may be connected to a host apparatus 3 through a local area network (LAN). The host apparatus 3 may be implemented by a general-purpose computer, which may be provided with a display device and an input device. The image processing apparatus 1 may be further connected to a network 15, such as the Internet. In this example, the image processing apparatus 1 is implemented by a printer capable of printing data received from the outside or stored in the image processing apparatus 1. However, the image processing apparatus 1 may be implemented, for example, as a copier capable of copying an original, a multifunctional apparatus (MFP) capable of performing one or more functions of scanning, faxing, copying, printing, storing and communicating via a network, or an information management apparatus capable of storing data, as long as it is capable of managing error information relating to an image processing job, as described below. When the image processing apparatus 1 is implemented by a scanner or MFP, other devices, such as a scanner engine, a scanner device, or a document feeder, may be additionally provided. For the descriptive purpose, in this specification, the image processing apparatus 1 may be referred to as the printer 1.

As illustrated in FIG. 1, the printer 1 includes a printer controller 2, an operation panel 4, and a printer engine 13.

The printer controller 2 converts print data, which may be received from the host apparatus 3 or the network 15 or obtained from a memory provided in the printer 1, to video data according to an operation mode, and outputs the video data to the printer engine 13. The operation mode may be set by the printer 1 using a printer driver. Alternatively, the operation mode may be set according to control data, which may be sent together with print data by a printer driver installed on the host apparatus 3 or any network apparatus provided on the network 15. As illustrated in FIG. 1, the printer controller 2 includes a host interface (I/F) 5, a program read only memory (ROM) 6, a font ROM 7, a panel I/F 8, a central processing unit (CPU) 9, a random access memory (RAM) 10, a nonvolatile (NV) RAM 11, an engine I/F 12, a network I/F 16, and a hard disk drive (HDD) 17, which are connected through a bus.

The CPU 9 may function as a system controller, which controls various kinds of operation performed by the printer 1. In one example, the CPU 9 may perform an image processing job such as storing data or printing data according to a request for performing the image processing job that is received from a user via any one of the operation panel 4, the host apparatus 3, and the network 15. In another example, the CPU 9 may monitor the image processing job to make sure that the image processing job is successfully performed, for example, by storing job information relating to the image processing job. In another example, the CPU 9 may detect an error relating to the image processing job and manage error information relating to the detected error, which may be generated based on the job information.

The CPU 9 may be provided with one or more memories, each of which may function as, for example, a system memory, a flame memory, a parameter memory, a program memory, or a font memory In this example, the program ROM 6, the font ROM 7, the RAM 10, the NV RAM 11, and the HDD 17 are provided. However, another memory may be optionally provided.

The program ROM 6 stores various kinds of programs used for processing or managing data or controlling peripheral modules, including, for example, an image processing control program for causing the CPU 9 to perform an image processing job including a print control program for causing the CPU 9 to perform a printing job, a job management program for causing the CPU 9 to monitor one or more image processing jobs performed or to be performed by the printer 1 and manage job information relating to the monitored jobs, and/or an error management program for causing the CPU 9 to detect an error relating to the image processing job and manage error information relating to the detected error generated based on the job information. The font ROM 7 stores various kinds of fonts for printing. The RAM 10 may function as a work area of the CPU 9, a buffer area for storing print data to be printed on one page of document, a buffer area for storing control data, or a bitmap memory for storing video data converted from the print data. The NV RAM 11 stores various data, for example, various parameters that may be used by the printer 1 even after the power of the printer 1 is turned off. The HDD 17 stores a large amount of data, including, for example, print data to be printed, any kind of program that may be used by the CPU 9, or any kind of information managed by the CPU 9, such as the job information or the error information.

The CPU 9 may be additionally provided with one or more interfaces, such as the host IF 5, the network I/F 16, the panel I/F 8, and the engine I/F 12. The host I/F 5 allows the printer controller 2 to communicate with the host apparatus 3, for example, by inputting print data or control data received from the host apparatus 3, or outputting status data to the host apparatus 3. The host I/F 5 may be implemented by a Universal Serial Bus (USB). The network I/F 16 allows the printer controller 2 to communicate with the network 15, for example, by inputting print data or control data received from the network 15, or outputting status data to the network 15. Alternatively, the function of the network I/F 16 may be performed, for example, by a network interface controller (NIC) provided in the printer controller 2 and a network I/F provided outside of the printer controller 2. The panel I/F 8 allows the printer controller 2 to communicate with the operation panel 4, for example, by inputting control data received from the operation panel 4, or outputting status data to the operation panel 4. The engine I/F 12 allows the printer controller 2 to communicate with the printer engine 13, for example, outputting control data or video data to the printer engine 13, or inputting status data received from the printer engine 13. In addition, the CPU 9 may be provided with a medium interface that allows the printer controller 2 to read out data from a removable medium or write data onto the removable medium.

The operation panel 4 has at least one of the functions of outputting status data received from the printer controller 2 to the user, and inputting control data to the printer controller 2 received from the user. For example, the operation panel 4 may include a display device, such as a liquid crystal display (LCD), capable of displaying various information to a user received from the printer controller 2, which includes an error report or help information as described below. Alternatively, the operation panel 4 may include any desired notifying device, for example, including a buzzer or a speaker. The operation panel 4 may further include an input device capable of inputting various information from the user, for example, information relating to the processing condition set by the user. The input device may be implemented by, for example, any number of keys, a keyboard, a ten key, a switch, a pointing device, or a microphone. Alternatively, the operation panel 4 may be implemented by a touch panel, which provides the functions of displaying and inputting.

The printer engine 13 performs printing operation under control of the printer controller 2. For example, the printer controller 2 causes the printer engine 13 to form a toner image as described below, according to the print control program stored in the program ROM 6.

First, the CPU 9 obtains a printing request for printing print data, which includes print data and control data, from the host apparatus 3 through the host I/F 5. The host apparatus 3 generates the printing request upon receiving a request for performing a printing job from a user, using the printer driver installed on the host apparatus 3. In this example, the print data corresponds to data to be printed, which is specified by the user. The control data may include a processing condition, such as a processing condition indicating various printing settings. The CPU 9 analyzes the received job by loading the print control program from the program ROM 6 onto the RAM 10, extracts the print data and the control data, and stores the print data and the control data in the RAM 10 for further processing. Second, the CPU 9 converts the print data to video data according to the control data. For example, when a character code is extracted, the CPU 9 analyzes the character code, converts the character code into an intermediate code including information regarding the print position, print size, character code, font, etc., and performs processing based on the intermediate code to expand the received data onto the RAM 10. The expanded data, which may correspond to one page of document, may be converted to the video data. Third, the printer controller 2 instructs the printer engine 13 to for a toner image according to the video data through the engine I/F 12, and sends the video data to the printer engine 13.

Alternatively, the printer controller 2 may perform any other kind of image processing job using any desired device provided in the printer 1. For example, the printer controller 2 may cause the HDD 17 to perform a storing job, which is to store data received from any one of the host apparatus 3 and the network 15.

In addition to performing an image processing job such as a printing job or a storing job described above, the printer controller 2 may monitor an image processing job requested by a user to check whether the image processing job is successfully performed, according to the job management program stored in the program ROM 6. For example, the printer controller 2 may store job information relating to the image processing job performed by the printer 1. Additionally, the printer controller 2 may detect an error relating to the image processing job, and store error information relating to the detected error, according to the error management program stored in the program ROM 6. As described below, the printer controller 2 may further generate an error report or help information using any kind of information obtainable from the error information.

Figure 2:
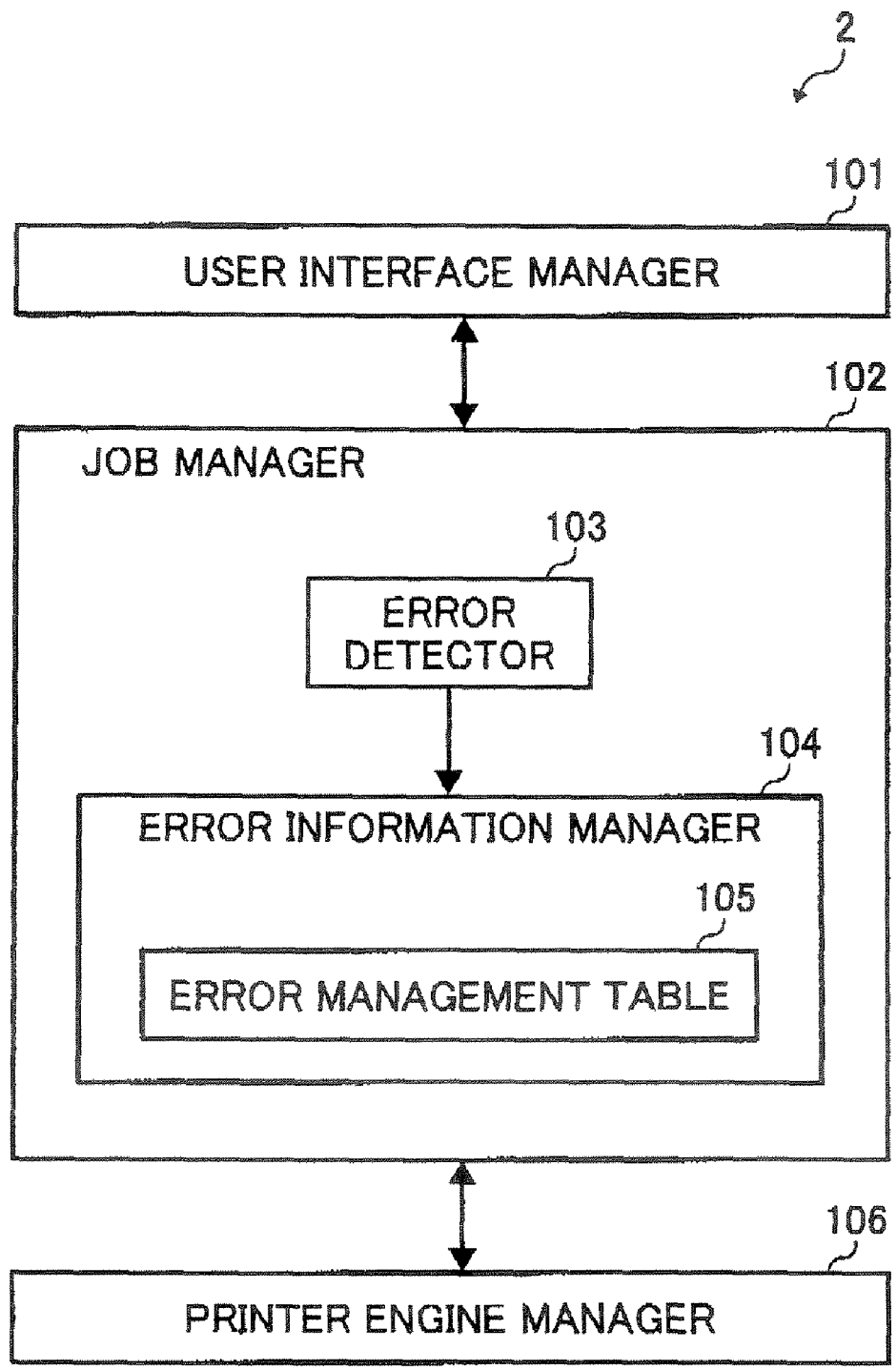
FIG. 2 is a schematic block diagram illustrating the functional structure of a selected portion of the printer controller shown in FIG. 1, according to an example embodiment of the present invention.

The function of detecting an error relating to an image processing job and managing error information of the detected error may be performed by one or more modules illustrated in FIG. 2.

Referring now to FIG. 2, the printer controller 2 may include a user interface (UI) manager 101, a job manager 102 including an error detector 103 and an error information manager 104, and a printer engine manager 106.

The UI manager 101 receives a request for performing an image processing job from the user via a user interface. In this example, the user interface may correspond to any one of the host apparatus 3, operation panel 4, and network 15 shown in FIG. 1. However, the user interface may be implemented by any desired device or apparatus having the function of inputting a request for performing an image processing job received from a user and/or the function of notifying the user of error information or help information received from the printer controller 2 of the printer 1. In this example, the request for performing the image processing job includes a processing condition set by the user, data to be processed, etc.

The printer engine manager 106 sends a request for performing a printing job to the printer engine 13 shown in FIG. 1.

The job manager 102 monitors one or more image processing jobs performed by the printer 1 or to be performed by the printer 1.

The error detector 103 detects an error relating to the image processing job. In one example, the error detector 103 detects a job setting error caused by mismatching between the processing condition obtained from the processing request and the processing capability of the printer 1. The processing capability of the printer 1 may correspond to a processing condition set by default specifically for the printer 1 or a processing condition available to the printer 1. For example, when a sheet size set by the user differs from the default sheet size of the printer 1, the error detector 103 detects a job setting error attributable to mismatching of the sheet size ("sheet size error"). Alternatively, when a memory size set by the user, such as the memory size of the data to be processed, differs from the default or available memory size of the printer 1, the error detector 103 detects a job setting error attributable to mismatching of the memory size ("memory full error").

In another example, the error detector 103 detects an image forming error when it is notified that the error is detected during an image forming operation, for example, by the printer engine 13 through the printer engine manager 106. For example, when the paper jam is detected by a sheet transfer device of the printer engine 13, the printer controller 2 is notified by the printer engine 13 that an image forming error attributable to the paper jam ("paper jam error") is generated. For the descriptive purpose, in this specification, the job setting error and the image forming error may be collectively referred to as the error relating to the image processing job.

The error information manager 104 manages error information relating to the error detected by the error detector 103. In this example, the error information may be stored in an error management table 105, which may be stored in any desired memory, such as the HDD 17 of FIG. 1. As described below, the error information manager 104 may perform various functions including storing error information, analyzing error information, generating an error report using error information, generating help information using error information, reporting the error report, reporting the help information, etc.

Figures 3, 4:
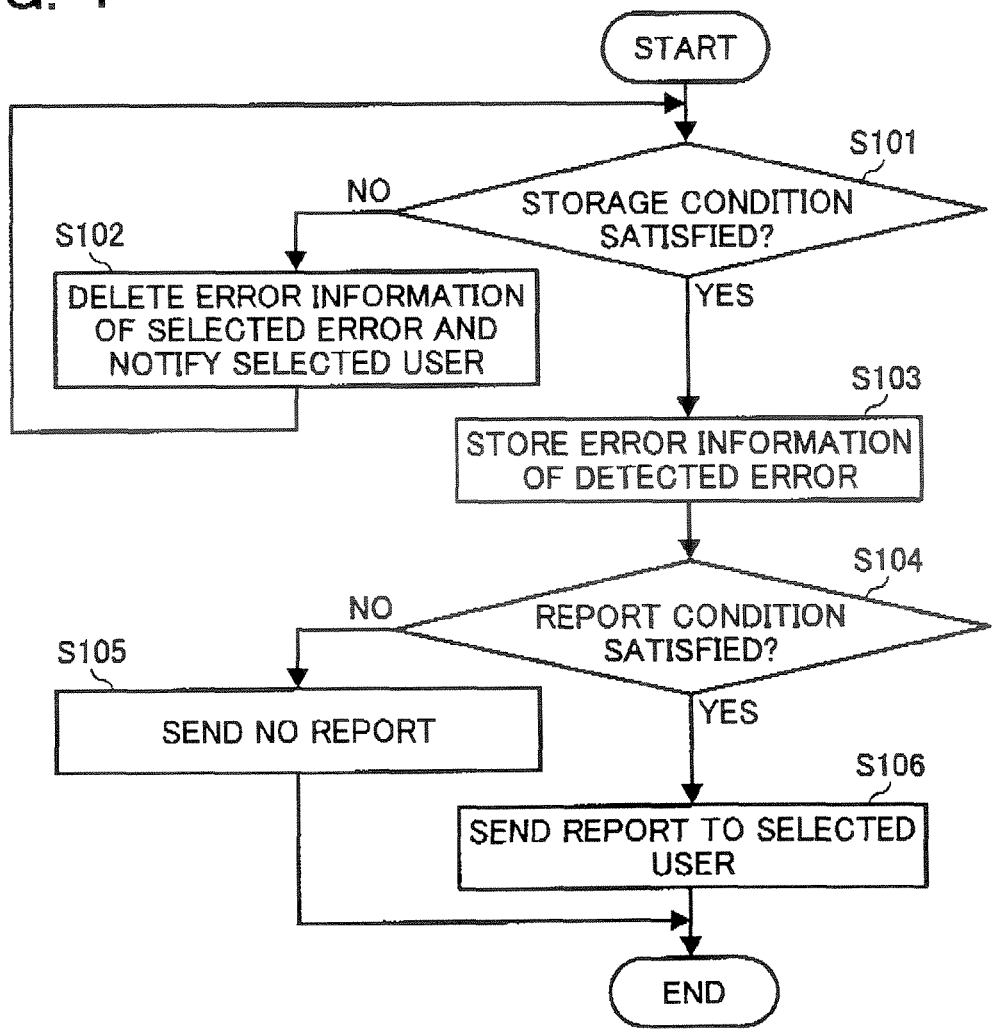
FIG. 3 is an example table listing one or more error information items obtainable by the image processing apparatus of FIG. 1.
FIG. 4 is a flowchart illustrating operation of storing error information and sending an error report generated from the error information when an error is detected, according to an example embodiment of the present invention.

For example, the error information manager 104 may store one or more error information items, which are selected from the items listed in the table of FIG. 3, in the error management table 105.

In this example, the error information items may include user information regarding a user who requests an image processing job in which the error is detected, such as the "USER NAME" item shown in FIG. 3. The "USER NAME" item corresponds to user identification information regarding a user who requests an image processing job in which the error is detected, such as the IP address of the host apparatus 3, the registered user name provided by the user at the time of logging in to the system, the email address of the user, etc.

The error information items may further include job information regarding the image processing job in which the error is detected, such as the "JOB NAME" item, "JOB CONDITION" item, "REQUEST SENT TIME" item, "REQUEST RECEIVED TIME" item, and/or "JOB START TIME" item. The "JOB NAME" item corresponds to job identification information regarding the image processing job in which the error is detected, such as the name of data to be processed that may be obtained from the image processing request. The "JOB CONDITION" item corresponds to job condition information regarding the image processing job in which the error is detected, such as the processing condition obtainable from the image processing request. The "REQUEST SENT TIME" item corresponds to time information indicating the date or time when the image processing request is sent from the user. The "REQUEST RECEIVED TIME" item corresponds to time information indicating the date or time when the image processing request is received by the printer 1. The "JOB START TIME" item corresponds to time information indicating the date or time when the printer 1 starts processing the image processing job according to the image processing request.

The error information items may further include error time information, such as the "ERROR DETECTED TIME" item and/or "ERROR RECOVERED TIME" item. The "ERROR DETECTED TIME" item corresponds to time information indicating the date or time when the printer 1 detects the error relating to the image processing job. The "ERROR RECOVERED TIME" item corresponds to time information indicating e date or time when the detected error is solved.

The error information items may further include error type information, such as the "ERROR TYPE" item that corresponds to error type information indicating the type of the detected error.

In addition to the items shown in FIG. 3, waiting time information obtained as the time difference between the "ERROR DETECTED TIME" item and the "ERROR RECOVERED TIME" item may be stored.

In this example, the error information items may be selected according to an error storage item condition previously set by the user. Referring to FIG. 3, the selected error information item is indicated by the "Y" value, while the non-selected error information item is indicated by the "N" value. Using the error storage item condition, the user may select the error information items according to the type of information that the user desires to obtain. For example, when an administrator desires to be informed about a user who repeatedly causes the same type of error, one or more error information items including at least the user information and the error type information may be selected. In another example, when an administrator desires to be informed about a user who needs a longer time to solve the error, one or more error information items including at least the user information and the error time information may be selected. Alternatively, the printer 1 may be additionally provided with a table storing the correspondence between a set of error information items to be selected and a type of information that can be derived from the set of error information items. The printer 1 may allow the user to select one of the information types, and select the corresponding set of error information items. By allowing the user to set the error storage item condition, the memory space of the printer 1 may be saved or the processing speed of the printer 1 may increase.

Further, in this example, the error information manager 104 may control the number of errors stored in e error management table 105 by setting an error storage condition. As described below referring to FIG. 5, the error storage condition is used to determine whether to store the selected error information items of the detected error. When it is determined that the detected error satisfies the error storage condition, the error information manager 104 stores the selected error information items of the detected error in the error management table 105. When it is determined that the detected error does not satisfy the error storage condition, the error information manager 104 stores no error information, and/or performs operation previously determined by an error storage operation condition. Such previously determined operation may include deleting the error information items of a previously detected error. In this example, the error information manager 104 may determine whether the detected error satisfies the error storage condition every time the error is detected or at predetermined time. In this manner, the memory space of the printer 1 may be saved or the processing speed of the printer 1 may increase.

In another example, the error information manager 104 may generate an error report using error information of one or more previously detected errors, when an error report condition is satisfied. In one example, as described below referring to FIG. 11A, the error report condition may be used to specify the report time at which the error report should be sent to the selected user. For example, the error report condition may be set such that the printer 1 periodically sends the error report to the administrator. Accordingly, error information may be easily managed. In another example, as described below referring to FIG. 5, the error report condition may be used to identify one or more previously detected errors to be reported, which falls under the same condition set by the processing condition of the processing request. For example, the error report condition may be set such that the error report lists previously detected errors caused by a specific user. Accordingly, the administrator may be well informed of the user who needs further assistance. In another example, the error report condition may be used to notify the administrator when the printer 1 is not recovered from the error for a long time period, by controlling the value of the waiting time information. In this example, the error information manager 104 may determine whether the detected error satisfies the error report condition every time the error is detected or at predetermined time.

The error report may be further sent to a selected user, which is previously determined according to an error report operation condition In this example, the error report may be generated according to an error report item condition, which determines one or more error information items to be included in the error report. The error report item condition may be made equal to the error storage item condition. Further, the error report may be generated in any desired format. In this manner, the way of managing error information may be adjusted according to various settings, for example, according to the user environment or the user need.

In another example, the error information manager 104 may generate help information using error information of one or more previously detected errors, when an error help condition is satisfied. In this example, the help information may be generated, which assists the user in performing the image processing job. The help information may be generated in any desired format. For example, the help information may be displayed as a check list that assists the user in performing the image processing job that the user just requested. In one example, the help information may be sent to the user requesting the image processing job, before an error relating to the image processing job is detected. In another example, the help information may be sent to the user who requests the image processing job in which an error is detected, after the error is detected. By providing help information to the user, the user may be prevented from causing the same type of error, thus reducing the frequency of errors that may be caused by the user with little knowledge.

Referring now to FIG. 4, operation of storing error information and/or sending an error report is explained according to an example embodiment of the present invention. The operation of FIG. 4 may be performed by the CPU 9 of the printer controller 2 when an error relating to an image processing job is detected after receiving a request for performing the image processing job from a user In such case, the CPU 9 may load the corresponding error management program from the program ROM 6 onto the RAM 10, and performs the operation of FIG. 4. Further, in this example, it is assumed that the error management table 105 stores error information for one or more errors previously detected.

S101 determines whether the currently detected error satisfies an error storage condition. As described below, the error storage condition may be used to restrict the number of errors stored in the error management table 105. When it is determined that the currently detected error satisfies the error storage condition ("YES" at S101), the operation proceeds to S103. Otherwise ("NO" at S101), the operation proceeds to S102.

In this example, as illustrated in FIG. 5, the error storage condition may specify the error retain time, which indicates a time period in which error information of the detected error is retained in the error management table 105. Referring to FIG. 5, the error retain time is set to one month such that the detected error is retained in the error management table 105 for the maximum of one month. For example, in order to keep the error retain time within one month, the CPU 9 may delete all errors stored in the error management table 105 at the end of each month. Alternatively or additionally, as illustrated in FIG. 5, the error storage condition may specify the maximum number of detected errors ("the maximum error number") stored in the error management table 105. In this example shown in FIG. 5, the maximum error number is set to 10.

S102 deletes error information of one or more previously detected errors from the error management table 105, and the operation returns to S101. In this example, the error to be deleted may be previously set. In one example, the error to be deleted may be set to the error having the "JOB START TIME" item or "ERROR DETECTED TIME" item with the earliest date or time. In another example, the error to be deleted may be set to the error generated by the user who has caused the largest number of errors, which is obtainable by analyzing the "USER NAME" item stored in the error management table 105. In another example, the error to be deleted may be set to all errors currently stored in the error management table 105.

Further, at S102, the CPU 9 may identify the user who has caused the error that has been deleted, and send notification to the identified user that the error is deleted from the error management table 105 via the user interface. Alternatively or additionally, the CPU 9 may send an error report including error information of the error that has been deleted to the identified user. Alternatively or additionally, the CPU 9 may send notification and/or the error report to the administrator.

When the currently detected error satisfies the error storage condition at S101, S103 stores error information obtained for the currently detected error in the error management table 105. As described above referring to FIGS. 2 and 3, the error information includes one or more error information items selected according to an error report item condition.

S104 determines whether the currently detected error satisfies an error report condition. As described below, the error report condition may be used to identify one or more errors that fall under the same condition set by the processing condition of the image processing job requested by the user. When it is determined that the currently detected error satisfies the error report condition ("YES" at S104), the operation proceeds to S106. Otherwise ("NO" at S104), the operation proceeds to S105.

In this example, as illustrated in FIG. 5, the error report condition may specify the values of one or more error information items stored in the error management table 105. Referring to FIG. 5, the "USER NAME" item is set to all users. The "JOB CONDITION" item is set to the condition in which at least two of the parameters including double-sided, condensed, recycle paper type, and A3 sheet size are selected by the user. The "JOB START TIME" item is set to any time between 13:00 and 18:30. The "ERROR DETECTED TIME" item is set to any time between 13:00 and 18:30. The "ERROR TYPE" item is set to at least one of the sheet size error and the fall memory error. The values of other items are not specified in this example.

When the currently detected error does not fall under the condition specified by the error report condition described above referring to FIG. 5, S105 sends no report and the operation ends.

When the currently detected error falls under the condition specified by the error report condition described above referring to FIG. 5, S106 generates an error report using error information that corresponds to the user who has sent the request, sends the error report to a selected user such as the user who has sent the request and/or the administrators and the operation ends. The currently detected error may be deleted from the error management table 105 after sending the error report to the selected user.

The error report may include one or more error information items stored in the error management table 105, which may be selected according to an error report item condition. In this example, all error information items stored in the error management table 105 are included in the error report.

Further, the error information items may be edited before they are reported in the form of error report. For example, any kind of time information, such as the "JOB START TIME" item or the "ERROR DETECTED NAME" item, may be displayed differently depending on the location of the printer 1 or the location of the user. The month may be expressed in the numerical form or language form that may be abbreviated. The time may be expressed in the numerical form with or without A.M. and P.M. The day of week may be expressed in the language form, which may be abbreviated. The separator, which separates the month, time, and/or day for better appearance, may be expressed as space, period, slash, etc. In this example, the printer 1 may be provided with a time format table, which stores the recommended time format in a corresponding manner with the location to which the printer 1 is shipped, for example, as illustrated in FIG. 18.

Further, the order of listing detected errors may be changed according to the user preference. In one example, in order to obtain information regarding the user who is most likely to cause an error, the detected errors may be sorted by the "USER NAME" item. In another example, in order to obtain information regarding the type of job that is most likely to end up in error, the detected errors may be sorted by the "JOB NAME" item, "JOB CONDITION" item, or "ERROR TYPE" item. In another example, in order to obtain information regarding a time interval in which the error is most likely to be detected, the detected errors may be sorted by the "REQUEST SENT TIME" item or "ERROR DETECTED TIME" item.

In addition to generating the error report at S106, the CPU 9 may generate help information based on the error information items of previously detected errors, and send the help information to a selected user.

The operation of FIG. 4 may be performed in various other ways. In one example, at S102, the error to be deleted may be set to the error having the "ERROR DETECTED TIME" item with the latest date or time. In such case, the operation ends without storing the currently detected error. In another example, the operation performed at S102 when the currently detected error does not satisfy the error storage condition, and/or the operation performed at S103 when the currently detected error satisfies the error storage condition, may not be limited to the above-described example. As illustrated in FIG. 6, an error storage operation condition, which describes the operation performed when the error storage condition is not satisfied and/or the operation performed when the error storage condition is satisfied, may be stored in a manner manageable by the CPU 9. For example, by changing the values in the table shown in FIG. 6, S102 or S103 may be performed in different ways. In another example, the operation of FIG. 4 may be performed at predetermined time other than the time when an image processing request is received, such as the time when the printer 1 is turned on.

Referring now to FIGS. 7A to 9, example cases in which the operation of FIG. 4 is performed are explained The example case illustrated in FIGS. 7A and 7B is the case in which the error storage condition and the error report condition are satisfied. The example case illustrated in FIGS. 8A and 8B is the case in which the error storage condition is not satisfied. The example case illustrated in FIGS. 7A and 9 is the case in which the error storage condition is satisfied but the error report condition is not satisfied.

In the example case illustrated in FIGS. 7A and 7B, the operation of FIG. 4 is performed by the CPU 9 when a user F sends a request for printing a file named "final exam" to the printer 1. At this time, the error management table 105, which may be stored in the HDD 17 (FIG. 1), stores five previously detected errors (FIG. 7A). Further, it is assumed that the processing condition included in the request does not match the processing capability of the printer 1, thus the sheet size error is detected. Specifically, in this example, error information items of the detected error include, the "USER NAME" item set to "F"; the "JOB NAME" item set to "final exam"; the "JOB CONDITION" item set to the condition in which the single-sided, non-condensed, recycle paper type, and A3 sheet size are selected; the "JOB START TIME" item set to 7/25/2005 13:10:23; and the "ERROR DETECTED TIME" item set to 7/25/2005 13:15:03.

Referring to FIG. 4, S101 determines whether the currently detected error satisfies the error storage condition described above referring to FIG. 5. In order to determine whether the error retain time is within one month, the CPU 9 may determine whether the date specified by the "JOB START TIME" item corresponds to the last date of the month. Since the "JOB START TIME" tem is set to 7/25/2005, which is not the last date of the month, the CPU 9 determines that error storage condition is satisfied. Further, the CPU 9 may determine whether the number of previously detected errors reaches the maximum error number of 10. Since the number of detected errors is 5, which is less than the maximum error number of 10, the CPU 9 determines that the error storage condition is satisfied. Since the currently detected error satisfies the error storage condition, the operation proceeds to S103 to store error information relating to the currently detected error.

S104 determines whether the currently detected error satisfies the error report condition described above referring to FIG. 5, by comparing the value of each item of error information obtained for the currently detected error with the value of each item of error information determined by the error report condition. Since the currently detected error satisfies the error report condition, the operation proceeds to S106 to generate an error report and send the report to the user F and/or the administrator In this example, the error report includes the error information items obtained for the previously detected errors caused by the user F, such as the detected error having the index number of 3 and the detected error having the index number 5, together with the error information items obtained for the currently detected error caused by the user F.

After sending the error report to the user F, the detected errors included in the 10 error report e.g., the detected errors having the index numbers 3 and 5 and the currently detected error, are deleted from the error management table 105. Accordingly, the error management table 105 may be updated as illustrated in FIG. 7B after performing the operation of FIG. 4.

In the example case illustrated in FIGS. 8A and 8B, the operation of FIG. 4 is performed by the CPU 9 when a user B sends a request for printing a file named "Hooke's law" to the printer 1. At this time, the error management table 105, which may be stored in the HDD 17 (FIG. 1), stores ten previously detected errors (FIG. 8A). Further, it is assumed that the processing condition included in the request does not match the processing capability of the printer 1, thus the sheet size error is detected. Specifically, in this example, error information items of the currently detected error include: the "USER NAME" item set to "B", the "JOB NAME" item set to "Hooke's law", the "JOB CONDITION" item set to the condition in which the single-sided, non-condensed, recycle paper type, and A3 sheet size are selected; the "JOB START TIME" item set to 7/25/2005 13:10:23; and the "ERROR DETECTED TIME" item set to 7/25/2005 13:15:03.

Referring to FIG. 4, S101 determines whether the currently detected error satisfies the error storage condition described above referring to FIG. 5. In order to determine whether the error retain time is within one month, the CPU 9 may determine whether the date specified by the "JOB START TIME" item corresponds to the last date of the month. Since the "JOB START TIME" tern is set to 7/25/2005, which is not the last date of the month, the CPU 9 determines that the error storage condition is satisfied. Further, the CPU 9 may determine whether the number of previously detected errors reaches the maximum error number of 10. Since the number of detected errors is 10, which is equal to the maximum error number, the CPU 9 determines the currently detected error does not satisfy the error storage condition, and the operation proceeds to S102.

S102 deletes one or more previously detected errors from the error management table 105. In this example, the detected error to be deleted is set to the detected error having the "JOB START TIME" item with the earliest date or tie. Referring to FIG. 7A, it is determined that the detected error having the index number of 1, which is caused by the user A, is deleted from the error management table 105. Further, in his example, the CPU 9 may identify one or more detected errors, which are caused by the user "A". Since the detected error having the index number of 3 is caused by the user "A", it is determined that the detected error having the index number of 3 is also deleted from the error management table 105. At this time, the CPU 9 may generate an error report including error information of the detected errors caused by the user A, such as the detected errors with the index numbers 1 and 3, respectively. The error report may be sent to the user A and/or the administrator Accordingly, the error management table 105 is updated as illustrated in FIG. 8B after performing the operation of FIG. 4.

In the example case illustrated in FIG. 7A and 9, the operation of FIG. 4 is performed by the CPU 9 when the user F sends a request for printing file named "final exam" to the printer 1. At this time, the error management table 105, which may be stored in the HDD 17 (FIG. 1), stores five previously detected errors (FIG. 7A) Further, it is assumed that the processing condition included in the request does not match the processing capability of the printer 1, thus the sheet size error is detected. Specifically, in this example, error information items of the currently detected error include the "USER NAME" item set to "F"; the "JOB NAME" item set to "final exam"; the "JOB CONDITION" item set to the condition in which the single-sided, non-condensed, recycle paper type, and A3 sheet size are selected; the "JOB START TIME" item set to 7/25/2005 19:50:11; and the "ERROR DETECTED TIME" item set to 7/25/2005 19:51:53

Referring to FIG. 4, S101 determines whether the currently detected error satisfies the error storage condition described above referring to FIG. 5. In order to determine whether the error retain time is within one month, the CPU 9 may determine whether the date specified by the "JOB START TIME" item corresponds to the last date of the month. Since the "JOB START TIME" tem is set to 7/25/2005, which is not the last date of the month, the CPU 9 determines that the error storage condition is satisfied. Further, the CPU 9 may determine whether the number of previously detected errors reaches the maximum error number of 10. Since the number of detected errors is 5, which is less than the maximum error number of 10, the CPU 9 determines that the error storage condition is satisfied. Since the currently detected error satisfies the error storage condition, the operation proceeds to S103 to store error information relating to the currently detected error.

S104 determines whether the currently detected error satisfies an error report condition described above referring to FIG. 5, by comparing the value of each item of error information obtained for the currently detected error with the value of each item of error information determined by the error report condition. Since the currently detected error does not satisfy the error report condition, the operation proceeds to S105 to end without generating or sending any error report. The error management table 105 may be updated as illustrated in FIG. 9 after performing the operation of FIG. 4.

Figures 10, 11A, 11B:
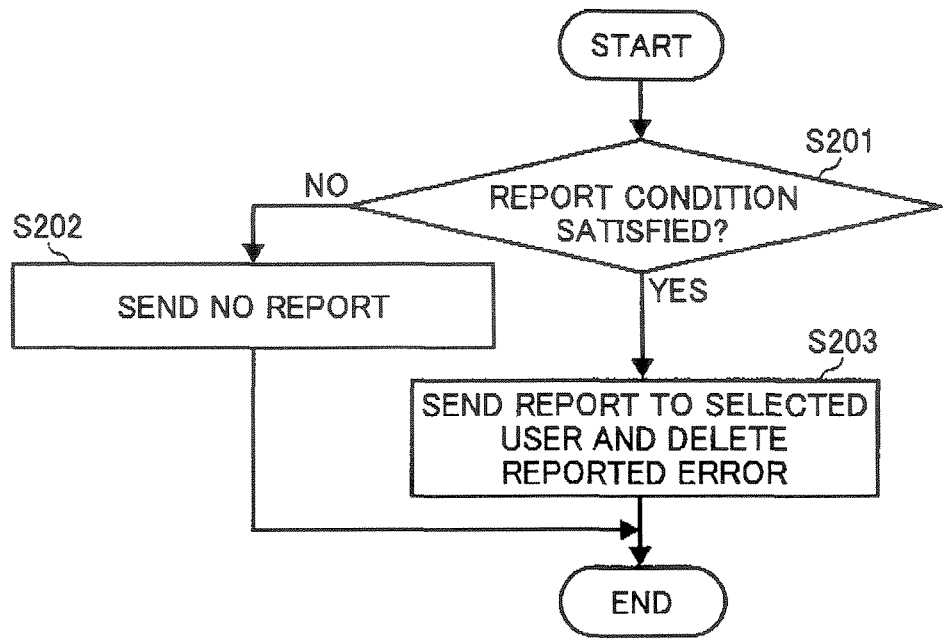
FIG. 10 is a flowchart illustrating operation of sending an error report at predetermined time, according to an example embodiment of the present invention.
FIG. 11A is an example table storing an error report condition.
FIG. 11B is an example table storing an error report operation condition.

Referring now to FIG. 10, operation of sending an error report at predetermiend time is explained according to an example embodiment of the present invention. In addition to the time when an error is detected, the CPU 9 may load the error management program from the program ROM 6 onto the RAM 10 at predetermined time to periodically notify the user of previously detected errors. For example, the operation of FIG. 10 may be performed when a time period counted by a timer reaches a predetermined time period. In this example, it is assumed that the error management table 105 stores error information for one or more previously detected errors.

S201 determines whether any one of the previously detected errors satisfies an error report condition. When it is determined that any one of the previously detected errors satisfies the error report condition ("YES" at S201), the operation proceeds to S203. Otherwise ("NO" at S201), the operation proceeds to S202 to end without sending any error report.

In this example, the error report condition may be used to determine the time at which the printer 1 sends an error report to the user. For example, as illustrated in FIG. 11A, the error report condition may specify the report time, which indicates the date and/or time at which the error report is generated and sent to a selected user. Referring to FIG. 11A, the error report time is set to the end of each month, 23:59:595 Alternatively or additionally, as illustrated in FIG. 11A, the error report condition may specify Me maximum number of detected errors ("the maximum error number") stored in the error management table 105. In this example, the maximum error number is set to 8.

When any one of the previously detected errors satisfies the error report condition, S203 generates an error report, sends the error report to a selected user, and the operation ends. In this example, the error report includes the error information items obtained for all previously detected errors. Further, the selected user corresponds to the administrator. At S203, after sending the error report, the CPU 9 may delete all previously detected errors from the error management table 105.

Further, as described above referring to FIG. 4, the error information items may be edited before they are reported in the form of error report. Further, the order of listing detected errors may be changed according to the user preference.

The operation of FIG. 10 may be performed in various other ways. In one example, when any one of the previously detected errors does not satisfy the error report condition at S201, the operation may proceed to S202, and return to S201. In this manner, the CPU 9 constantly monitors error information stored in the error management table 105. In another example, when any one of the previously detected errors does not satisfy the error report condition at S201, the operation may proceed to S202, and return to S201 only when the number of determining is below a predetermined number. Accordingly, the CPU 9 monitors error information stored in the error management table 105 for a predetermined time period even when none of the detected errors satisfies the error report condition. In another example, the operation performed at S202 when any one of the previously detected errors does not satisfy the error report condition, and/or the operation performed at S203 when any one of the previously detected errors satisfies the error report condition, may not be limited to the above-describe example. As illustrated in FIG. 11B, an error report operation condition, which describes the operation performed when the error report condition is not satisfied and/or the operation performed when the error report condition is satisfied, may be stored in a manner manageable by the CPU 9. For example, by changing the values in the table shown in FIG. 11B, S202 or S203 may be performed in different ways.

Referring now to FIGS. 7A and 12, an example case in which the operation of FIG. 10 is performed is explained. In this example, it is assumed that the error management table 105 stores five previously detected errors as illustrated in FIG. 7A. Further, it is assumed that the time in which the operation of FIG. 10 is performed is 7/31/2005, 23:50:00.

Referring to FIG. 10, S201 determines whether any one of tie previously detected errors satisfies the error report condition described above referring to FIG. 11A. Since the current time is different from the error report time (FIG. 11A) and the number of detected errors, which is five, does not reach the maximum error number of eight, the operation of FIG. 10 ends without generating or sending an error report.

When the current time reaches the error report time, which is 23:59:59, S201 of FIG. 10 determines that the error report condition is satisfied, and the operation proceeds to S203 to generate an error report. For example, in order to obtain information regarding the user who is most likely to cause an error, the detected errors may be sorted by the "USER NAME" item. The sorted detected errors are then listed in the order from the detected error caused by the user who has caused the largest number of errors, as illustrated in FIG. 12.

Figures 13, 14:
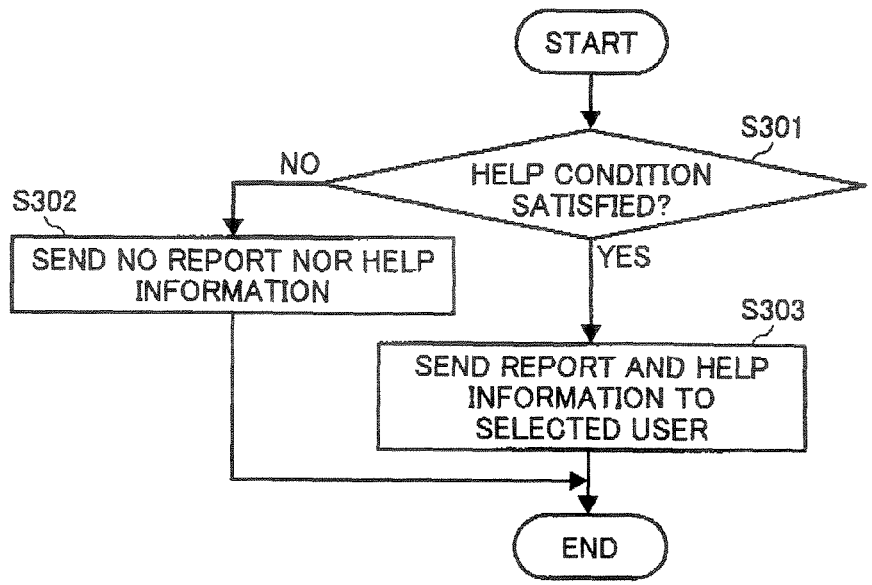
FIG. 13 is a flowchart illustrating operation of sending an error report and/or help information when a processing request is received, according to an example embodiment of the present invention.
FIG. 14 is an example table storing an error help condition.

Referring now to FIG. 13 operation of sending an error report and/or help information when a processing request is received is explained according to an example embodiment of the present invention. The operation of FIG. 13 may be performed by the CPU 9 of the printer controller 2 when a request for performing an image processing job is received from a user. In such case, the CPU 9 may load the error management program from the program ROM 6 onto the RAM 10, and performs the operation of FIG. 10.

S301 determines whether the processing condition included in the image processing request satisfies an error help condition. In this example, the error help condition may be used to identify one or more previously detected errors that fall under the same processing condition of the image processing request. When it is determined that the processing condition satisfies the error help condition ("YES" at S301), the operation proceeds to S303, Otherwise ("NO" at S301), the operation proceeds to S302.

In this example, as illustrated in FIG. 14, the error help condition may specify the values of one or more items of error information stored in the error management table 105. Referring to FIG; 14, the "USER NAME" item is set to users A and B. The "JOB CONDITION" item is set to the condition in which at least two of the parameters including double-sided, condensed, recycle paper type, A3 sheet size, and staple are selected by the user. The "JOB START TIME" item is set to any time between 13:00 and 18:30. The "ERROR DETECTED TIME" item is set to any time between 13:00 and 18:30. The "ERROR RECOVERED TIME" item is set to any time between 9:00 and 12:00. The "ERROR TYPE" item is set to at least one of the sheet size error, the full memory error, and the jam error. The values of other items are not specified in this example.

When the processing condition of the image processing request does not fall under the condition specified by the error help condition described above referring to FIG. 14, S302 sends no report nor help information, and the operation ends.

When the processing condition of the image processing request falls under the condition specified by the error help condition described above referring to FIG. 14, S303 generates an error report and help information, sends the error report and the help information to a selected user, and the operation ends.

In this example, the error report may be generated according to an error report item condition, which may be previously set according to the user preference. Further, the help information may be generated in various ways, for example, as a pop-up window, a warning message, etc.

The operation of FIG. 13 may be performed in various other ways. In one example, the operation performed at S302 when the processing condition does not satisfy the error help condition, and/or the operation performed at S303 when the processing condition satisfies the error help condition, may not be limited to the above-described example. As illustrated in FIG. 15, information regarding the operation performed when the error help condition is not satisfied and/or the operation performed when the error help condition is satisfied may be stored in a manner manageable by the CPU 9. For example, by changing the values in the table shown in FIG. 15, S302 or S303 may be performed in different ways.

Referring now to FIGS. 8A and 16, an example case in which the operation of FIG. 13 is performed is explained. In the example case illustrated in FIGS. 8A and 16, the operation of FIG. 13 is performed by the CPU 9 when a user A sends a request for printing a file named "day trip" to the printer 1. At this time, the error management table 105, which may be stored in the HDD 17 (FIG. 1), stores ten previously detected errors (FIG. 8A). Further, the processing condition of the image processing request is set by the user A as follows. The "USER NAME" item is set to the user "A". The "JOB NAME" item is set to "day trip". The "JOB CONDITION" item is set to the condition in which the single-sided, non-condensed, normal paper type, A4 sheet size, stapled, and Z folded are selected. Further, the "JOB START TIME" item is 7/25/2005 10:05:22.

Referring to FIG. 13, S301 determines whether the processing condition of the request satisfies the error help condition described above referring to FIG. 14. Since the processing condition satisfies the error help condition, the operation proceeds to S303 to generate an error report and help information.

As illustrated in FIG. 16, the error report includes error information of previously detected errors, which are caused by the user A, obtained from the table shown FIG. 8A. The error report shown in FIG. 16 indicates that the sheet size error may be generated, thus warning the user A to check the processing condition relating to the sheet size.

As illustrated in FIG. 17, the help information may be displayed to the user A, which includes a list of items to be checked in order to prevent one or more types of error. Since the processing condition of the request falls under the same condition when the sheet size error is detected, the check item that recommends the user to check the processing condition relating to the sheet size is marked. In this manner, the user A may be prevented from causing the sheet size error.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, error information, or any information used for managing error information including an error storage item condition, error storage condition, error storage operation condition, error report item condition, error report condition, error report operation condition, and error help condition, may be stored in any desired memory with any desired format, as long as the user is able to change the value of such information according to various settings. For example, any one of the above-described information may be stored in one or more tables. In another example, any of the above-described information may be stored as flag information. Further, any one of the above-described information may be previously determined in a corresponding manner with various types of information that the user may desire to obtain. Further, in order to allow the user to set or change any one of the above-described information, the printer 1 may determine whether the user is an authorized user.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image processing apparatus, comprising:
   a user interface manager coupled to a user interface and configured to receive a processing request for performing an image processing job from a user through the user interface, the processing request comprising a processing condition of the image processing job set by the user;

an error detector configured to detect a job setting error caused by mismatching between the processing condition of the image processing job and a processing capability of the image processing apparatus as a currently detected error;

an error management table configured to store error information relating to a previously detected error that is a job setting error previously detected by the error detector;

a table configured to store an error report condition which indicates whether the previously detected error has a same condition as the processing condition of the image processing job set by the user; and an error information manager configured to:
  store error information relating to the currently detected error in the error management table when the error information manager determines the currently detected error satisfies an error storage condition;
  determine whether the currently detected error satisfies the error report condition by comparing a value of each item of the error information relating to the currently detected error with a value of each item of error information specified by the error report condition; and
  generate an error report to notify the user who has sent the processing request and an administrator when the value of each item of the error information relating to the currently detected error matches the value of each item of error information specified by the error report condition, the error report including items of the error information relating to the previously detected errors caused by the user who has sent the processing request.

2. The apparatus of claim 1, wherein the error storage condition controls a number of the previously and currently detected errors stored in the error management table by setting at least one of:
  error retain information indicating a maximum time period in which the previously detected error or the currently detected error is retained in the error management table after being stored by the error information manager; and
  error number information indicating a maximum number of the previously detected errors, which is retained in the error management table after being stored by the error information manager.

3. The apparatus of claim 1, wherein the error information manager is further configured to perform operation previously defined by an error storage operation condition when the currently detected error does not satisfy the error storage condition.

4. The apparatus of claim 1, wherein the error information relating to the previously detected error and the currently detected error includes one or more error information items selected according to an error storage item condition, the one or more error information items including:
  a user information item regarding the user who sends the processing request;
  a job information item regarding the image processing job; and
  an error type information item indicating a type of the currently detected error or the previously detected error.

5. The apparatus of claim 1, wherein the error report includes one or more error information items selected according to an error report item condition, the one or more error information items including:
  report time information indicating a date or time at which the error report is generated; and
  error number information indicating a maximum number of the previously detected errors, which is retained in the error management table after being stored by the error information manager.

6. The apparatus of claim 4, wherein the error report condition defines a value of a user information item of the error information such that the error report is generated when the user information item of the error information relating to the currently detected error matches the user information item of the error information relating to the previously detected error.

7. The apparatus of claim 6, wherein the error report condition further defines a value of at least one of a job information item and an error type information item such that the error report is generated when at least one of the job information item and the error type information item of the currently detected error matches the corresponding one of the job information item and the error type information of the previously detected error.

8. The apparatus of claim 4, wherein the error information of the previously detected error includes at least one of:
  an error time information item comprising an error detected time information item indicating a date or time when the previously detected error is detected by the error detector and an error recovered time information item indicating a date or time when the previously detected error is solved; and
  a waiting time information item obtained as the time difference between the date or time when the previously detected error is detected by the error detector and the date or time when the previously detected error is detected.

9. The apparatus of claim 8, wherein the error report condition sets a value of the waiting time information item to a predetermined value such that the error report is generated when a value of the waiting time information item of the previously detected error is equal to or greater than the predetermined value set by the error report condition.

10. The apparatus of claim 1, wherein the error information manager is further configured to generate help information to assist the user in performing the image processing job when the processing condition of the processing request satisfies an error help condition.

11. The apparatus of claim 1, further comprising:
  an engine manager coupled to an image forming device and configured to send a request for performing an image forming job to the image forming device,
  wherein the error detector is further configured to detect an image forming error caused by the image forming device as the currently detected error upon receiving notification from the engine manager.

12. An image processing method, comprising:
  receiving a processing request, for performing an image processing job by an image processing apparatus, from a user, the processing request comprising a processing condition of the image processing job set by the user;
  detecting a job setting error caused by mismatching between the processing condition of the image processing job and a processing capability of the image processing apparatus as a currently detected error; and
  storing error information relating to a previously detected error that is a job setting error previously detected;
  storing an error report condition which indicates whether the previously detected error has a same condition as the processing condition of the image processing job set by the user;

determining whether the stored error information relates to the currently detected error when the currently detected error satisfies an error storage condition;

determining whether the currently detected error satisfies the error report condition by comparing a value of each item of the error information relating to the currently detected error with a value of each item of error information specified by the error report condition; and generating an error report to notify the user who has sent the processing request and an administrator when the value of each item of the error information relating to the currently detected error matches the value of each item of error information specified by the error report condition, the error report including items of the error information relating to the previously detected errors caused by the user who has sent the processing request.

13. The method according to claim 12, wherein the error information relating to the previously detected error and the currently detected error includes one or more error information items selected according to an error storage item condition, the one or more error information items including:
   a user information item regarding the user who sends the processing request;
   a job information item regarding the image processing job; and
   an error type information item indicating a type of the currently detected error or the previously detected error.

14. The method according to claim 13, wherein the error report condition defines a value of a user information item of the error information such that the error report is generated when the user information item of the error information relating to the currently detected error matches the user information item of the error information relating to the previously detected error.

15. The method according to claim 14, wherein the error report condition further defines a value of at least one of a job information item and an error type information item such that the error report is generated when at least one of the job information item and the error type information item of the currently detected error matches the corresponding one of the job information item and the error type information of the previously detected error.

16. The method according to claim 12, further comprising:
   generating help information to assist the user in performing the image processing job when the processing condition of the processing request satisfies an error help condition.

17. The method according to claim 12, further comprising:
   sending a request for performing an image forming job, based on the image processing job, to an image forming device; and
   detecting an image forming error caused by the image forming device as the currently detected error upon receiving a notification from an engine manager connected to the image forming device.

* * * * *